United States Patent

Genise et al.

Patent Number: 5,335,566
Date of Patent: * Aug. 9, 1994

[54] SHIFT CONTROL METHOD/SYSTEM

[75] Inventors: Thomas A. Genise, Dearborn; Ronald K. Markyvech, Allen Park, both of Mich.

[73] Assignee: Eaton Corporation, Cleveland, Ohio

[ * ] Notice: The portion of the term of this patent subsequent to Dec. 28, 2010 has been disclaimed.

[21] Appl. No.: 909,332

[22] Filed: Jul. 6, 1992

[51] Int. Cl.$^5$ .................... B60K 41/18; B60K 41/06
[52] U.S. Cl. .................................... 477/124; 74/335; 364/424.1; 477/904
[58] Field of Search ............... 74/335, 866; 364/424.1

[56] References Cited

U.S. PATENT DOCUMENTS

| | | | |
|---|---|---|---|
| 4,945,483 | 7/1990 | Tokoro | 74/866 X |
| 5,035,160 | 7/1991 | Morita | 364/424.1 X |
| 5,089,962 | 2/1992 | Steeby | 74/866 X |
| 5,166,879 | 11/1992 | Greene et al. | 364/424.1 |

Primary Examiner—Dirk Wright
Assistant Examiner—Khoi Q. Ta
Attorney, Agent, or Firm—Howard D. Gordon

[57] ABSTRACT

A control system/method for an at least partially automated mechanical transmission system (10) is provided for determining if selected upshifts into a target gear ratio are feasible (208) or not feasible (210) under current vehicle operating conditions and for prohibiting the initiation of not feasible selected upshifts.

20 Claims, 6 Drawing Sheets

SHIFT CONTROL METHOD/SYSTEM

BACKGROUND OF THE INVENTION

Related Applications

This application is related to U.S. Ser. No. 909,335, titled SHIFT ENABLE CONTROL METHOD/SYSTEM filed the same day, Jul. 6, 1992 now U.S. Pat. No. 5,272,939 and assigned to the same assignee, EATON CORPORATION, as this application.

Field of Invention

This invention relates to control methods and systems for controlling the shifting of at least partially automated vehicular mechanical transmission systems. In particular, the present invention relates to shift control methods/systems for automated mechanical transmission wherein the probabilities of successfully completing a selected upshift are evaluated in view of existing vehicle operating conditions and only feasible shifts are initiated.

Description of the Prior Art

Fully automatic transmission systems, both for heavy-duty vehicles, such as heavy-duty trucks, and for automobiles, that sense throttle openings or positions, transmission shaft speeds, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic, hydraulic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense engine fueling, throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic mechanical transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuator, are required to be provided, installed and maintained.

Another type of partially automated transmission system utilizes a semi-automatic shift implementation system/method for a mechanical transmission system for use in vehicles having a manually only controlled engine throttle means and/or a manually only controlled master clutch. The system usually has at least one mode of operation wherein the shifts to be semi-automatically implemented are automatically preselected and includes a control/display panel or console for operator selection of a ratio change or operation in the automatic preselection mode and indication of automatic preselection of upshifts, downshifts or shifts into neutral. An electronic control unit (ECU) is provided for receiving input signals indicative of transmission input and output shaft speeds and for processing same in accordance with predetermined logic rules to determine (i) if synchronous conditions exist, and (ii) in the automatic preselection mode, if an upshift or downshift from the currently engaged ratio is required and to issue command output signals to a transmission actuator for shifting the transmission in accordance with the command output signals.

Under certain conditions, preselection and/or implementation of an automatically preselected shift is prohibited to prevent unexpected and/or undesirable shifts. Preferably, the operator is provided with means, such as manual depression of the clutch pedal, to release the shift prohibiting means. Conditions at which implementation of automatically preselected shifts should be prohibited may include relatively high or relatively low vehicle speed, operation of the vehicle brakes and/or retarder, and/or the fuel throttle in the idle position.

The control/display device will display the selected but not yet implemented shift as well as the current status of the transmission, and, preferably will also allow the operator to manually select/preselect a shift into a higher ratio, a lower ratio or into neutral. Preferably, the control device will also allow a manually or an automatically preselected shift to be cancelled.

Transmission systems of this general type may be seen by reference to U.S. Pat. Nos. 5,050,079; 5,053,959; 5,053,961; 5,053,962; 5,063,511; 5,081,588; 5,089,962; and 5,089,965, the disclosures of all of which are hereby incorporated by reference.

While the above-described automatic, and/or partial automatic shift implementation type vehicular mechanical transmission systems are well suited for their intended applications, they are not totally satisfactory as they will occasionally initiate an attempted shift, which, due to vehicle operating conditions, cannot be completed. This is especially a concern for upshifts of these mechanical transmission systems not provided with an automated clutch actuator and/or an input shaft brake and thus have input shaft deceleration limited to the normal decay rate of the engine without the benefit of an input shaft brake or the like.

SUMMARY OF THE INVENTION

In accordance with the present invention, the drawbacks of the prior art are minimized or overcome by the provision of a shift control method/system for a vehicular at least partially automated mechanical transmission system which, upon sensing an automatic or manual selection of an upshift from a currently engaged gear ratio to a target gear ratio will, based upon currently sensed vehicle operating conditions, determine if the selected shift is feasible (i.e. probably completeable) and only initiate feasible shifts.

A criticism of certain less than fully automated mechanical transmission systems (such as transmission systems without automatic master clutch control) and/or input shaft brakes) is that under certain conditions they may not be able to complete some shifts that they start (i.e., on a grade, low gear shifts, etc.).

However, a transmission system does not have to be able to make all shifts under all conditions. It just needs to be smart enough to know not to start a shift it cannot finish. In accordance with the present invention, the transmission control, prior to initiation of a shift, will make a simple passive test for shiftability. The test involves momentarily slightly changing the throttle amount which should be transparent to the driver, and observing the response. Based upon the response, shift feasibility is determined and requests for nonfeasible upshifts are either modified or cancelled.

The above is accomplished in vehicles having a large variation in CVW (combined vehicle weight) by providing a shift control system which, upon selection of an upshift from a currently engaged ratio to a target ratio (usually as a function of engine fueling, throttle position, engine speed, vehicle speed and/or currently engaged ratio) will automatically cause a slight decrease in engine fueling (about 10%) for a short interval of time, sense the change in vehicle acceleration, predict the vehicle reaction to a torque break shift transient, determine an estimated vehicle speed during the shift transient into the target ratio and compare this value to expected engine speed (equals input shaft speed) during the proposed shift transient to determine if the proposed shift is feasible, i.e. can substantial synchronous be achieved.

If the proposed shift (usually an upshift) is not feasible, the shift request may be modified (i.e. a skip shift request changed to single shift) or cancelled for a predetermined period of time (such as 10 seconds).

For vehicles of substantially constant gross combined weight ("GCW"), such as buses, mobile cranes, etc., assuming a vehicle equipped with an electronic data link, such as defined in SAE J 1922 protocol, on which engine torque or a parameter indicative of engine torque may be sensed, upon determination that an upshift from a currently engaged ratio into a target ratio is desired, current engine torque and vehicle speed are sensed from which the controller can estimate vehicle deceleration at zero torque (i.e. during a shift transient). The system then proceeds to determine if the proposed shift is feasible utilizing the logic discussed above.

Accordingly, a control system/method for a vehicular at least partially automated mechanical transmission system for partially automatic implementation of selected transmission shifts is provided which, under preselected conditions, will prohibit initiation of a selected shift, usually an upshift, not deemed feasible.

This and other objects and advantages of the present invention will become apparent from a reading of the detailed description of the preferred embodiment taken in connection with the attached drawings.

DESCRIPTION OF THE PREFERRED EMBODIMENT

Figure 1:
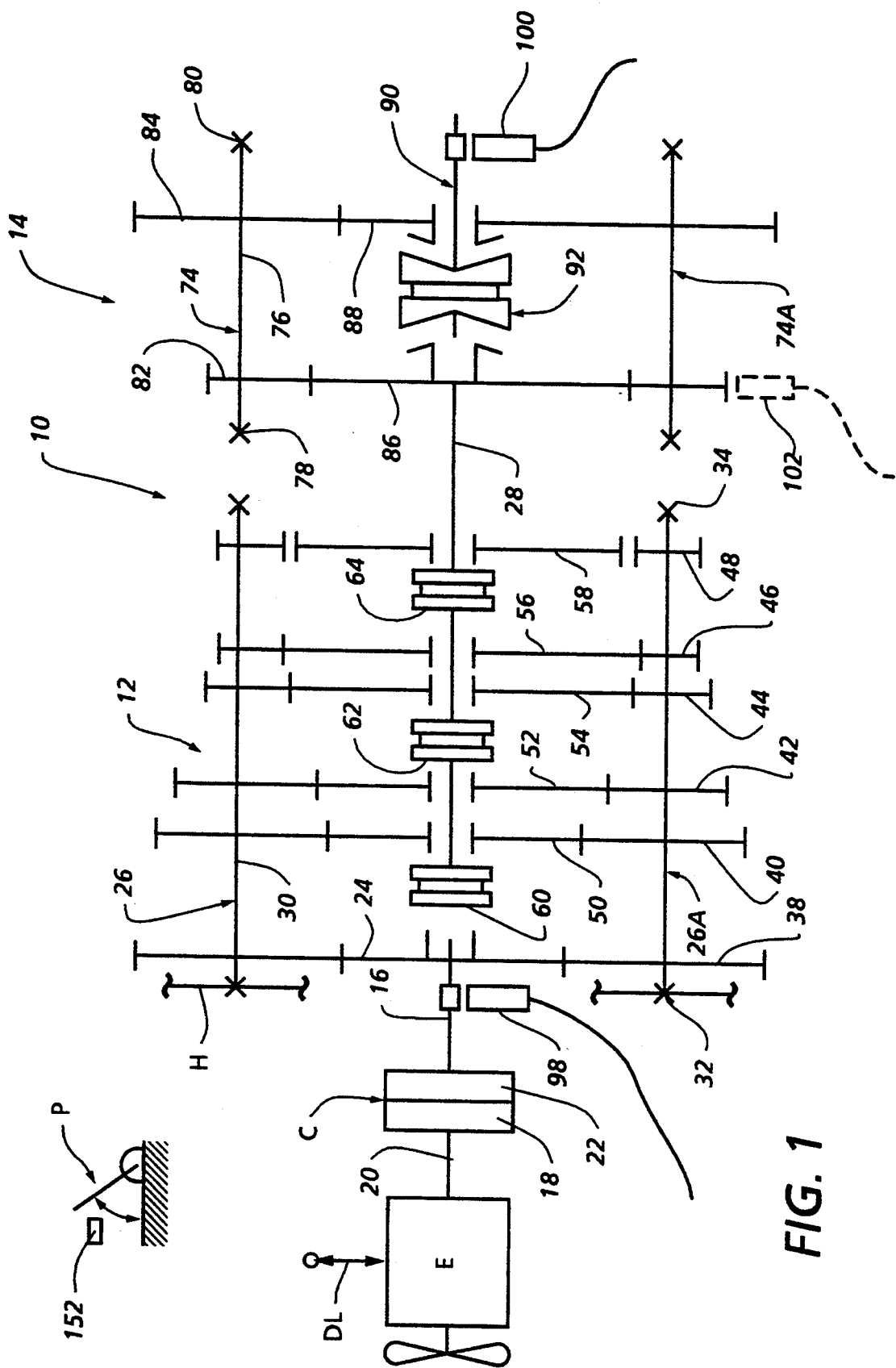
FIG. 1 is a schematic illustration of the vehicular mechanical transmission system partially automated by the system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shilling from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio.

Referring to FIG. 1, a range type compound transmission 10 of the type partially automated by the semi-automatic mechanical transmission system having an automatic preselect mode of operation of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J 1922 protocol, and the master clutch C is manually controlled by a clutch pedal (not shown) or the like. An input shaft brake (not shown), operated by manual overtravel depression of the clutch pedal, may be provided to provide quicker manual upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

Partially automated vehicular mechanical transmission systems of the type illustrated may be seen by reference to above-mentioned U.S. Pat. Nos. 5,050,079; 5,053,959; 5,053,961; 5,053,962; 5,063,511 and 5,089,965.

Although the control method/system of the present invention is particularly useful for those automated mechanical transmission systems not having clutch actuators or input shaft brakes, the present invention is not limited to such use.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by beatings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
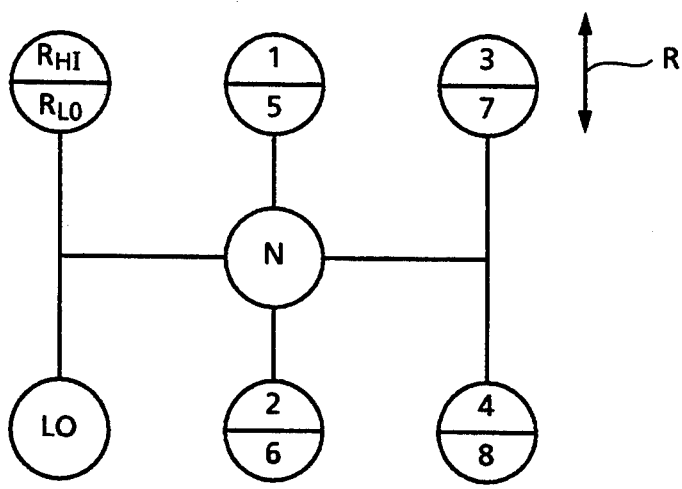
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing the automatic preselect mode of operation and the semi-automatic shift implementation operation of transmission 10, an input shaft speed (IS) sensor and an output shaft speed (OS) sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

Figure 2:
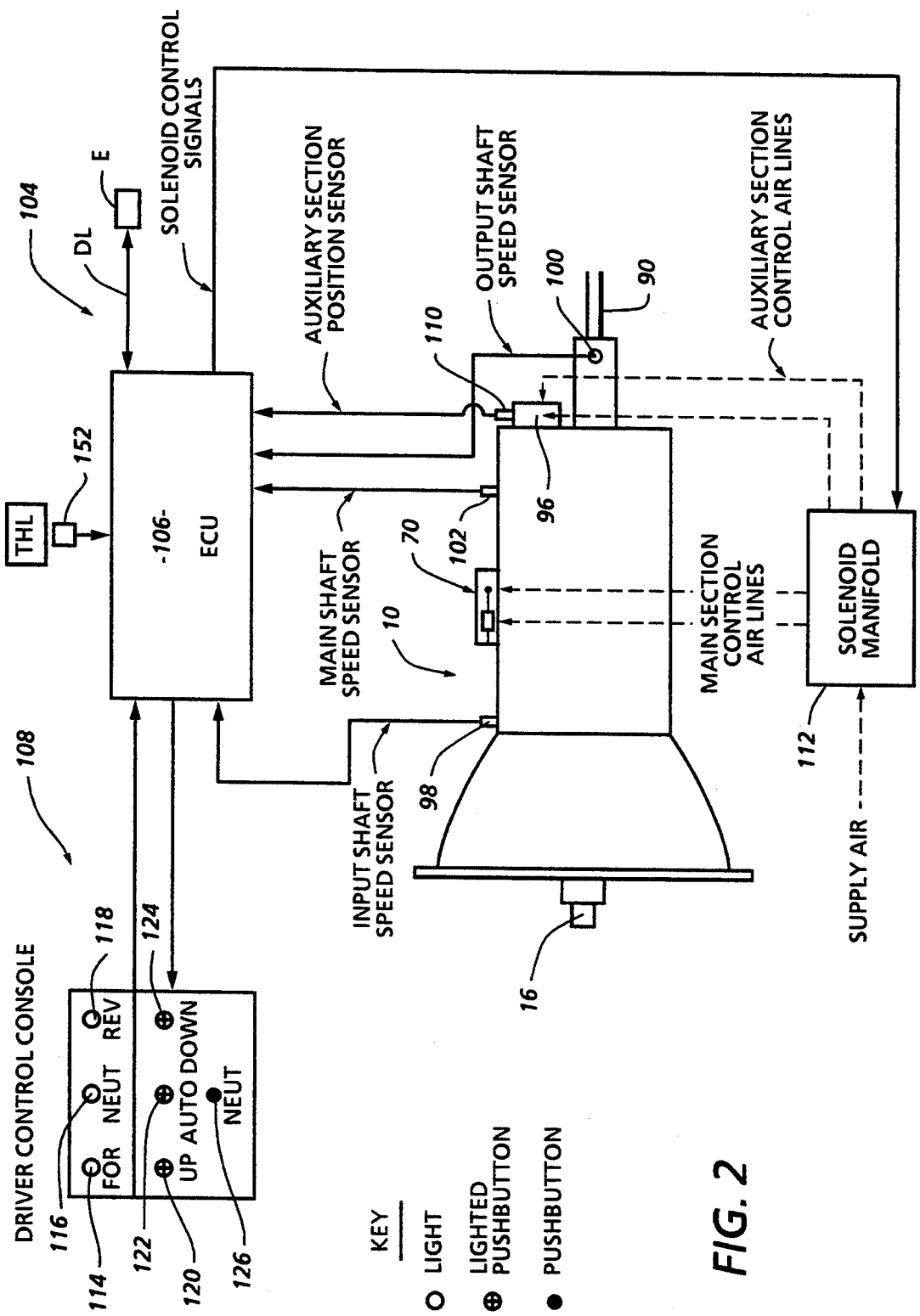
FIG. 2 is a schematic illustration of the automatic preselect and semi-automatic shift implementation system for a mechanical transmission system of the present invention.

The automatic preselect and semi-automatic shift implementation control system 104 for a mechanical transmission system of the present invention is schematically illustrated in FIG. 2. Control system 104, in addition to the mechanical transmission 10 described above, includes an electronic control unit 106, preferably microprocessor based, for receiving input signals, from the input shaft speed sensor 98, from the output shaft speed sensor 100 (or, alternatively, the mainshaft speed sensor 102) and from the driver control console 108 from a throttle pedal P position sensor 152 and from the engine E though data link DL. The ECU 106 may also receive inputs from an auxiliary section position sensor 110.

The ECU 106 may be of the type illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108, and through the data link DL to engine E.

In the preferred embodiment, the driver control counsel allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection is made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine (ES) speed (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the operator or the ECU controller causing a torque reversal by manually momentarily decreasing and/or increasing the supply of fuel to the engine and/or manually or automatically disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged (GR Target), which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

In the automatic preselection mode of operation, selected by use of lighted pushbutton 122, the ECU will, based upon stored logic rules, currently engaged ratio (which may be calculated by comparing input shaft to output shaft speed), output shaft or vehicle speed and/or throttle pedal position determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode and the shift preselected thereby by depression of pushbutton 122.

Under certain operating conditions of the vehicle, an automatically or manually selected shift may not be completable. These conditions usually involve upshifts when the vehicle is heavy loaded and/or is traveling against a great resistance, such as in mud, up a steep grade and/or into a strong headwind. To achieve substantial synchronous conditions to complete an upshift, the speed of the input shaft 16 (which substantially equals the speed of the engine E with the master clutch engaged) must be lowered to substantially equal the speed of the output shaft 90 (directly proportional to vehicle speed) multiplied by the target gear ratio. As an automated clutch actuator and input shaft brake are not provided, the speed of the input shaft will decrease with the rate of decay of engine speed. Thus, to achieve substantially synchronous conditions for engagement of the target ratio, IS should substantially equal $OS*GR_{TARGET}$ and, with the master clutch fully engaged, IS will substantially equal ES.

Figure 5:
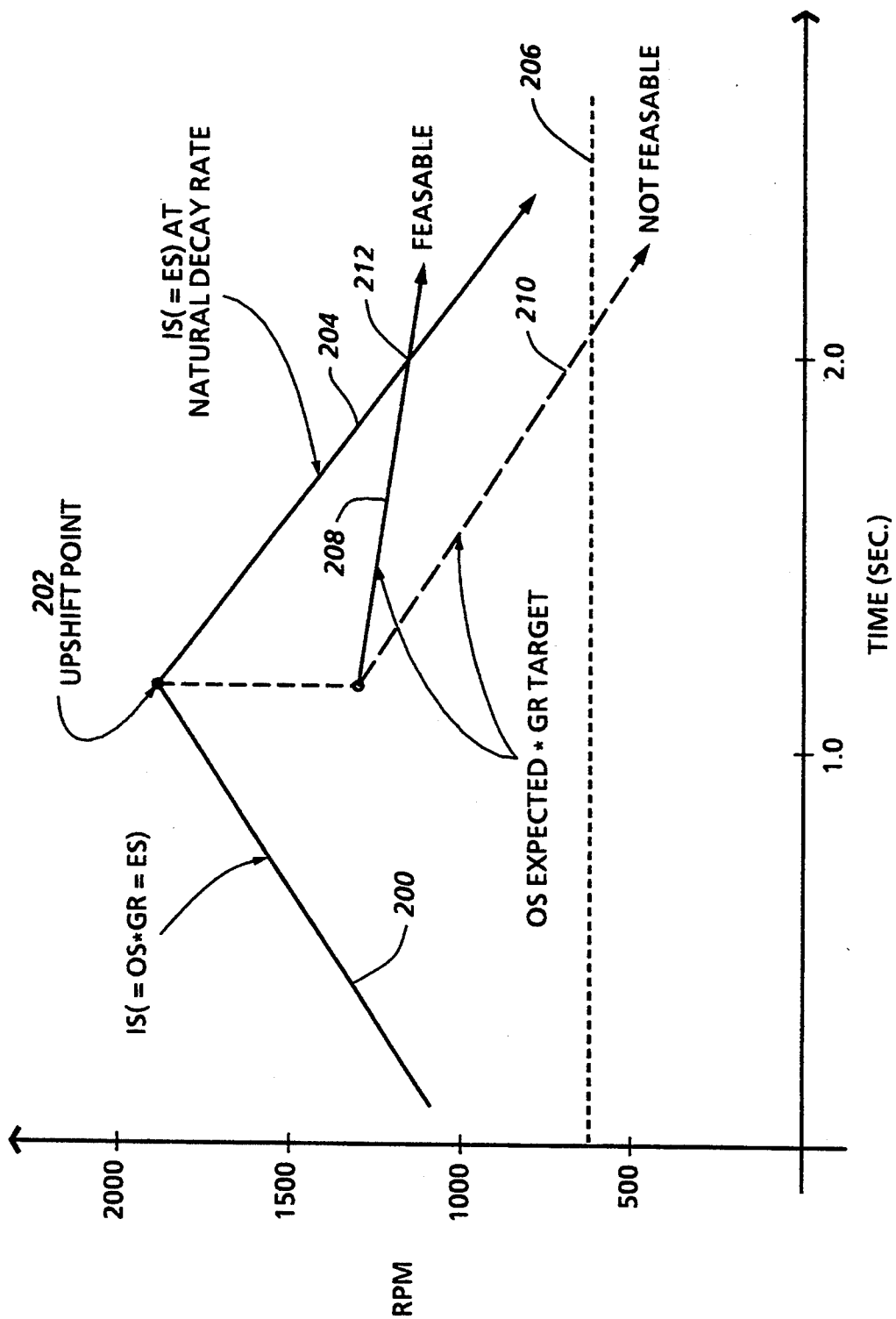
FIG. 5 is a graphical representation of an upshift event illustrating both feasible and not feasible attempted shifts.

The sequence of an upshift of the illustrated automated mechanical transmission system is graphically illustrated in FIG. 5. Line 200 represents the input shaft speed (IS) at vehicle conditions prior to the upshift point 202 wherein the current gear ratio (GR) is fully engaged, the master clutch C is fully engaged and ES- $=IS=OS*GR$. As the engine is defueled (i.e. fueling of the engine is reduced to a minimum value), the input shaft speed and engine speed will decay at the constant (but not necessarily linear) rate (dIS/dt) represented by line 204 until idle speed 206 is reached. The expected speed of the output shaft 90 during the shift transient when zero engine torque is applied to the vehicle drive wheels ($OS_{EXPECTED}$) multiplied by the target gear ratio, which product is the required synchronous speed of the input shaft/engine, is represented by lines 208 and 210 illustrating, respectively, that product at a lesser or greater, respectively, resistance to motion of the vehicle. As may be seen, under conditions of lower resistance (line 208), synchronous will occur at point 212 and the selected upshift is feasible while, under conditions of greater resistance (line 210), substantial synchronous will not occur and the selected upshift is not feasible.

In a typical diesel engine of a heavy duty track, the engine/input shaft decay rate is about 300 to 800 RPM and both the engine and vehicle deceleration may be approximated as linear. The specific rate of decay of the engine and/or input shaft may be predetermined or may be learned by differentiating the value of ES and/or IS signals during a defueling condition, see, for example, above-mentioned U.S. Pat. No. 4,361,060.

Figure 4:
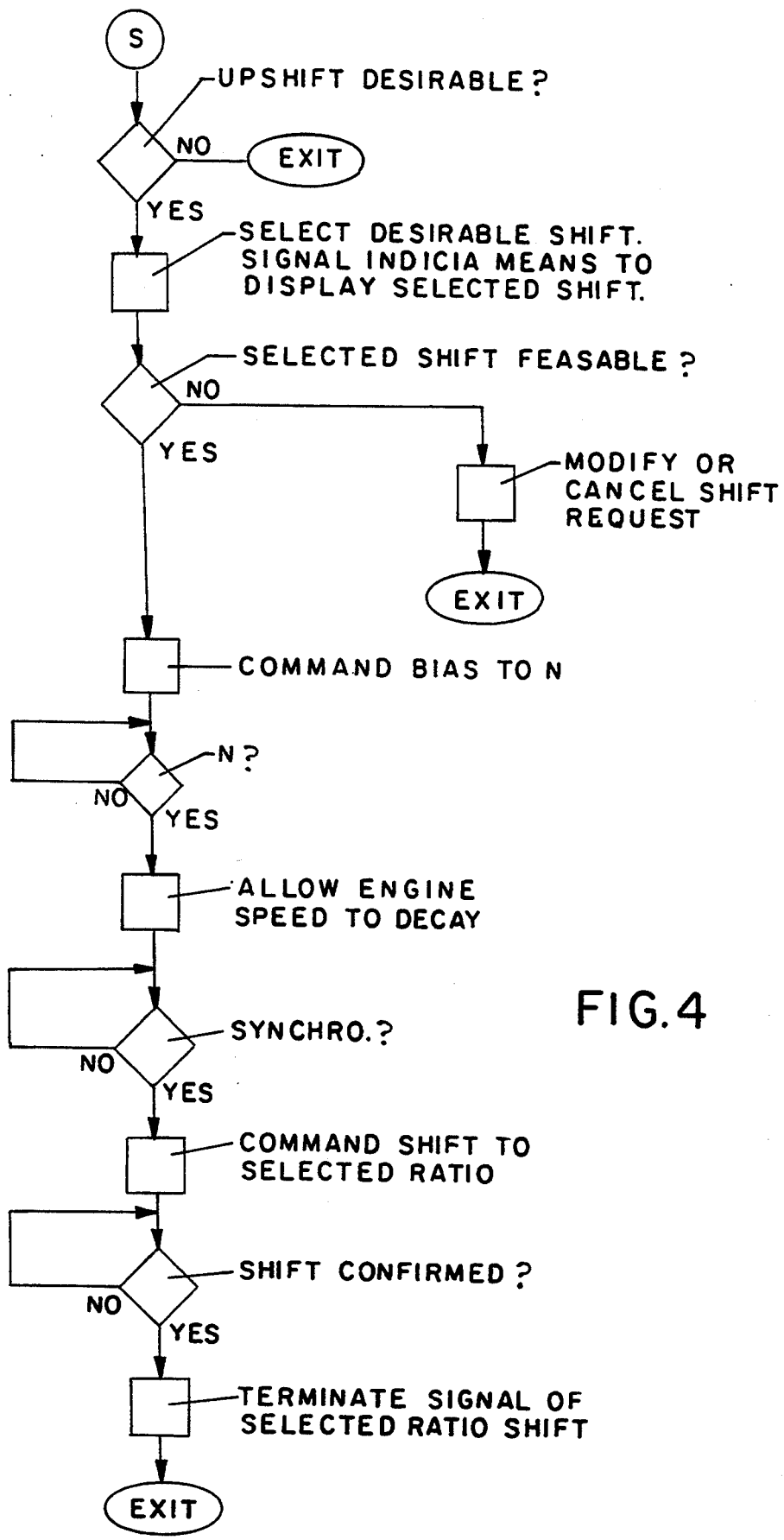
FIG. 4 is a schematic illustration, in flow chart format, of the inventive control method of the present invention.

According to the upshift control method/system of the present invention, selected upshifts are evaluated, prior to initiation thereof, to determine if feasible or not feasible, and not feasible selections are either modified or cancelled. The upshift sequence according to the control systems/method of the present invention is schematically illustrated, in flow chart format, in FIG. 4.

As may be seen by reference to FIG. 5, if the input shaft speed (IS) as determined by initial shaft speed at point 202 and the acceleration of the input shaft (dIS/dt), will be equal to the product of expected output shaft speed at zero torque to the vehicle drive wheels ($OS_{EXPECTED}$), which is determined by initial OS ($-IS/GR$) and the vehicle acceleration (dOS/dt) at current resistance to vehicle motion, multiplied by the numerical value of the target gear ratio ($GR_{TARGET}$) at a value greater than a reference (such as engine idle speed 206), then achieving a synchronous shift into the selected target gear ratio is feasible, if not, achieving a substantially synchronous shift into the selected target gear ratio is infeasible. The OS and dOS/dt signals are, of course, equivalent of vehicle speed and vehicle acceleration signals, respectively. The reference value is illustrated as engine idle speed 206 but can be a lower positive value if the master clutch is manually or automatically disengaged.

To accomplish the above, for vehicles having a widely variable gross combined weight ("GCW"), i.e. combined weight of vehicle, fuel, carno (if any) passengers (if any) and operator, the following procedure is followed. Upon sensing that an upshift (single or skip) has been selected by the system controller, ECU 106, the ECU will issue commands over the data link DL to momentarily slightly reduce fueling of the engine to cause a known momentary slight reduction of engine torque. By way of example, a ten percent (10%) reduction of engine torque for one second or less should be sufficient and should be transparent to (i.e. not noticed by) the driver. During this time, the change in vehicle (output shaft) acceleration is sensed. From this information, the system can determine what the vehicle acceleration (usually a deceleration) will be at zero driveline torque, i.e. the slope of line 208 or 210. Based upon this information and a present or learned value of engine decay rate, i.e. the slope of line 204, which may vary with engine speed, operating temperature, etc., the ECU can then determine if, under current vehicle operating conditions, the system is able to successfully complete the proposed shift. Based upon this information, the control system can then either (i) issue command signals to implement the proposed shift, or (ii) modify the proposed shift (usually command a single rather than a skip upshift, or (iii) cancel/prohibit the shift request for a predetermined period of time (such as, for example, about 10 seconds).

Briefly, the acceleration of the vehicle at zero torque can be approximated by the relationship $$A_{0\ TORQUE} = A_i - (T_i/CW)$$

where:
$A_i$ = vehicle acceleration at engine torque i, to the drive wheels
C = a constant,
$T_i$ = engine torque i, to the drive wheels and
W = gross vehicle weight.

The value of gross vehicle weight W and the constant C are determined during the momentary decrease in engine torque by determining the corresponding change on vehicle acceleration.

The above relationship is derived as follows:

$$T = C_1 W + C_2 V^2 + C_3 G \cdot W + C_4 W/g(A)$$

where:
T = engine torque
W = gross vehicle weight
V = vehicle velocity
G = a factor proportional to grade
A = current acceleration
$C_i$ = constants, related to drivetrain and engaged gear ratio and where:
$C_1 W$ represents engine torque, delivered to the drive wheels, to overcome rolling resistance;
$C_2 V^2$ represents engine torque, delivered to the drive wheels, to overcome aerodynamic diag.
$C_3 \cdot G \cdot W$ represents engine torque, delivered to the drive wheels, to overcome grade resistance; and
$C_4(W/g) A$ represents engine torque, delivered to the drive wheels to achieve acceleration A A change in engine torque, from $T_1$ to $T_2$, is represented:

$$T_1 - T_2 = C_2(W-W) + C_2(V_1^2 - V_2^2) + C_3 \cdot G(W-W) + C_4 W/g(A_1 - A_2).$$

considering that:
$W - W = 0$;
$V_1^2 - V_2^2 = 0$ ($V_1$ almost equals $V_2$);
$C = C_4/g$,
the relationship may be rewritten:

$$T_1 - T_2 = C \cdot W(A_1 - A_2), \text{ or}$$

$$(T_1 - T_2)/(A_1 - A_2) = C \cdot W$$

Setting $T_2$ equal to zero torque, $$T_1 = C \cdot W(A_1 - A_0)$$

$$T_1 = C \cdot W \cdot A_1 - C \cdot W \cdot A_0$$

$$A_0 = (C \cdot W \cdot A_1 - T_1)/(C \cdot W)$$

If gross vehicle weight is a known substantially constant value, such as in a bus, than the value for CW may be predetermined and memorized, which allows vehicle deceleration at zero torque under current operating conditions to be determined by sensing current engine torque ($T_1$) and vehicle acceleration ($A_1$) and solving for $A_0 = A_1 - (T_1/CW)$.

Figure 3:
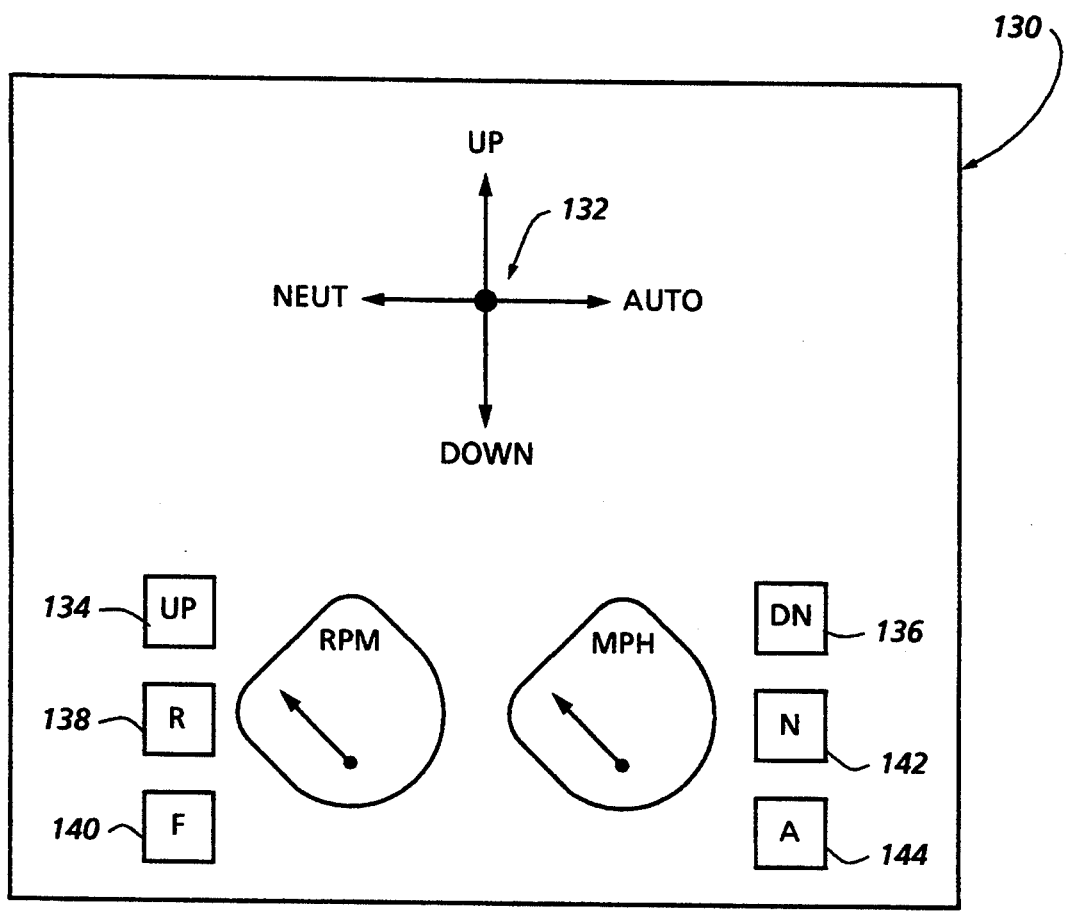
FIG. 3 is a schematic illustration of an alternate control console for the system of FIG. 2.
Figure 3A:
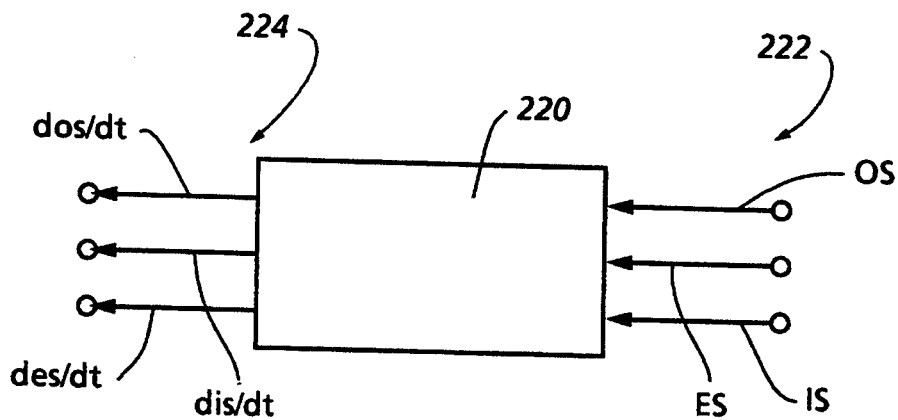
FIG. 3A is a schematic illustration of logic for differentiating signals representative of current vehicle and engine speed.

FIG. 3A schematically illustrates a logic element or subroutine 220 for differentiating various input signals 222 such as OS and/or ES to determine the derivatives with respect to time thereof, dOS/dt and/or dES/dt, as output signals 224.

Figure 3B:
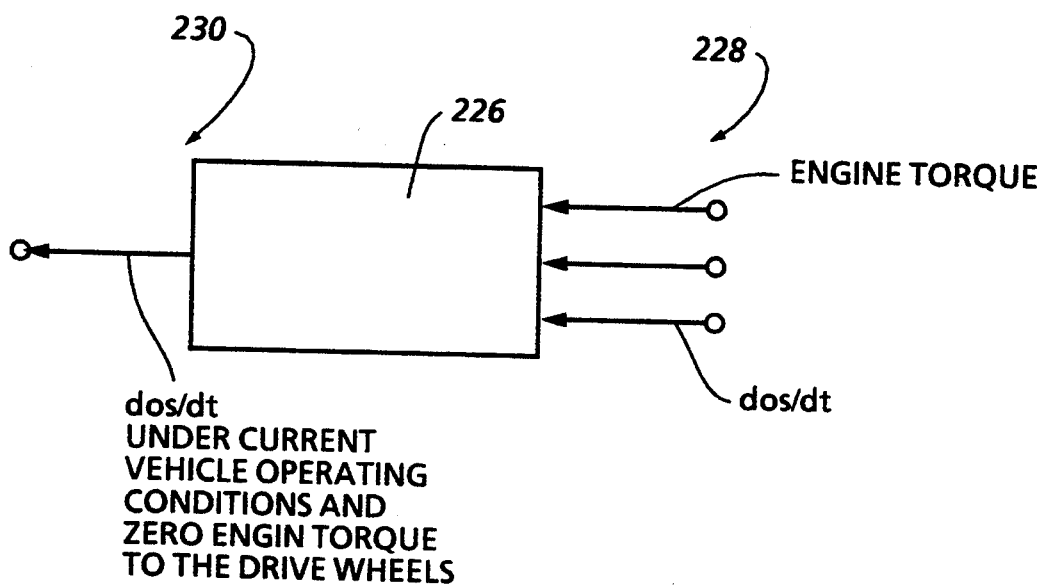
FIG. 3B is a schematic illustration of logic for calculating an expected vehicle acceleration during the shift transient when zero engine torque is applied to the drive wheels.

FIG. 3B schematically illustrates a logic element or subroutine 226 wherein input signals 228 including indicative of engine torque and vehicle acceleration (DOS/dt) are processed according to the logic rules set forth above to determine an output signal value 230 indicative of expected vehicle acceleration (dOS/dt) during the shift transient when no engine torque is applied to the vehicle drive wheels.

An alternate driver control and display console 130 may be seen by reference to FIG. 3. A joy stick 132 is movable against a resilient bias from its centered position to select upshifts, downshifts, a shift to neutral or the automatic preselect mode by movement up, down, leftward or rightward, respectively, as indicated. Indicia lights 134 and 136 are lighted to indicate an upshift or downshift, respectively, is preselected. Indicia lights 138 and 140, respectively, are lighted to indicate a vehicle forward or reverse, respectively, mode of operation. Indicia light 142 is steadily lighted to indicate a transmission neutral condition and is flashed to indicate a preselected but not yet confirmed neutral condition. Indicia light 144 is lighted to indicate system 104 is operating in the automatic preselection mode of operation.

Accordingly, it may be seen that a relatively simple and inexpensive shift implementation control system/method for automated mechanical transmission system 10 requiring only a transmission shift actuator (112/70/96) an electronic engine control and data link DL, and two speed inputs to be added to vehicle mechanical transmission system is provided. An electronic control unit 106 for receiving the two speed inputs, and inputs from the engine data link and operator's console, and for issuing command outsignals to the engine, actuators and to the display portion of the operator's console is also provided. The system automatically evaluates the feasibility, under current vehicle operating conditions, of manually or automatically preselected shifts and either causes such proposed shifts to be executed, modified or cancelled.

Although the present invention has been described with a certain degree of particularity, it is understood that various changes to form and detail may be made without departing from the spirit and the scope of the invention as hereinafter claimed.

We claim:

1. A control system for controlling at least partially automated implementation of selected shifts of a vehicular mechanical change gear transmission system comprising a controlled fuel throttle controlled engine (E), a multi-speed change gear mechanical transmission (10) having an input shaft (16) and an output shaft (90) adapted to drive vehicular drive wheels, said input shaft having a determinable expected acceleration during a gear ratio change operation, a master friction clutch (C) drivingly interposed between the engine and the transmission, a first sensor (98) for providing a first input signal indicative of transmission input shaft (16) rotational speed, a second sensor (100) for providing a second input signal indicative of vehicle speed, a third sensor (DL) for providing an input signal indicative of engine torque and a transmission actuator (112, 70, 96) for controlling shifting of the transmission, said control system characterized by;

means for determining selection of a shift from a currently engaged transmission ratio to a target gear ratio, means for determining as a function of at least said input signals indicative of (i) current engine torque and (ii) current vehicle acceleration, the expected vehicle acceleration ($A_0$) under current vehicle operating conditions and at zero engine torque to the drive wheels;

means for determining as of function of (i) expected vehicle acceleration ($A_0$) under current vehicle operating conditions and zero engine torque to the drive wheel, (ii) the gear ratio of the selected target gear ratio and (iii) the expected input shaft acceleration during a shift into the target gear ratio, feasibility or infeasibility of achieving substantially synchronous conditions for engagement of the target ratio if the selected shift is implemented, and means for causing the initiation of a selected shift only upon a determination of feasibility of achieving substantially synchronous conditions for engagement of the target gear ratio.

2. The control system of claim 4 wherein said means for determining the expected vehicle acceleration under current vehicle operation conditions and zero engine torque to the drive wheel comprises:

means effective, while remaining in the currently engaged ratio, for causing a change in engine torque from a first torque value ($T_1$) to a second torque value ($T_2$) and means for determining the vehicle accelerations ($A_1$, $A_2$) at both said first and second engine torque values.

3. The control system of claim 5 wherein said change in engine torque values is no greater than about ten percent (10%) of said first torque value and occurs for a period of time no greater than about one second.

4. A control method for controlling at least partially automated implementation of selected shifts of a vehicular mechanical change gear transmission system comprising a controlled fuel throttle controlled engine (E), a multi-speed change gear mechanical transmission (10) having an input shaft (16) and an output shaft (90) adapted to drive vehicular drive wheels, said input shaft having a determinable expected acceleration during a gear ratio change operation, a master friction clutch (C) drivingly interposed between the engine and the transmission, a first sensor (98) for providing a first input signal indicative of transmission input shaft (16) rotational speed, a second sensor (100) for providing a second input signal indicative of vehicle speed, a third sensor (DL) for providing an input signal indicative of engine torque and a transmission actuator (112, 70, 96) for controlling shifting of the transmission, said control method characterized by;

determining selection of a shift from a currently engaged transmission ratio of a target gear ratio, determining as a function of at least said input signals indicative of (i) current engine torque and (ii) current vehicle acceleration, an expected vehicle acceleration ($A_0$) under current vehicle operating conditions and at zero engine torque to the drive wheels;

determining as of function of (i) the expected vehicle acceleration ($A_0$) under current vehicle operating conditions and at zero engine torque to the drive wheels, (ii) the gear ratio of the selected target gear ratio and (iii) the expected input shaft acceleration during a shift into the target gear ratio, feasibility or infeasibility of achieving substantially synchronous conditions for engagement of the target ratio if the selected shift is implemented, and causing the initiation of a selected shift only upon a determination of feasibility of achieving substantially synchronous conditions for engagement of the target gear ratio.

5. The control method of claim 4 wherein said determining the expected vehicle acceleration under current vehicle operating conditions and at zero engine torque to the drive wheels comprises:

while remaining in the currently engaged ratio, causing a change in engine torque from a first torque value ($T_1$) to a second torque value ($T_2$) and determining the vehicle accelerations ($A_1$, $A_2$) at both said first and second engine torque values.

6. The claim of claim 5 wherein said change in engine torque values is no greater than about ten percent (10%) of said first torque value and occurs for a period of time no greater than about one second.

7. A control method for controlling at least partially automated implementation of automatically selected upshifts of a vehicular mechanical change gear transmission system comprising a controlled fuel throttle controlled engine (E), a multi-speed change gear mechanical transmission (10), having an input shaft (16) and an output shaft (90) adapted to drive vehicular drive wheels a master friction clutch (C) drivingly interposed between the engine and the transmission, a first sensor (98) for providing a first input signal indicative of transmission input shaft (16) rotational speed, a second sensor (100) for providing a second input signal indicative of vehicle speed, a third sensor (DL) for providing an input signal indicative of current engine torque, means for storing data indicative of expected deceleration rates of the transmission input shaft upon defueling of the engine with the master clutch engaged and the transmission shifted to neutral, a non-manually controllable transmission actuator (112, 70, 96) for controlling shifting of the transmission, said control method characterized by, upon selection of an upshift from a currently engaged gear ratio to a target gear ratio;

means for determining as a function of at least (i) curent engine torque (T) and (ii) current vehicle acceleration (A), an expected vehicle acceleration ($A_O$) under current vehicle operating conditions with the transmission shifted to neutral;

means for determining, as a function of at least (i) expected vehicle acceleration ($A_0$) under current vehicle operating conditions with the transmission shifted to neutral, (ii) the gear ratio of the selected target gear ratio and (iii) the expected deceleration rate of the transmission input shall upon refueling of the engine with the master clutch engaged and the transmission shifted to neutral, the feasibility or infeasibility of achieving substantially synchronous conditions for jaw clutch engagement of the target gear ratio if the selected upshift is initiated, and means for causing initiation of the selected upshift only upon a determination of feasibility of achieving said substantially synchronous conditions.

8. The method of claim 7 wherein said input signal indicative of vehicle speed is a signal indicative of output shaft (90) rotational speed.

9. The control method of claim 7 wherein said means for determining the expected vehicle acceleration under current vehicle operation conditions comprises:

means for causing a change in engine torque from a first torque value ($T_1$) to a second torque value ($T_2$) and determining the vehicle accelerations ($A_1$, $A_2$) at both said first and second engine torque values.

10. The method of claim 9 wherein said change in engine torque values is no greater than about ten percent (10%) of said first torque value and occurs for a period of time no greater than about one second.

11. The control method of claim 7 wherein said expected vehicle acceleration ($A_0$) is determined of the expression $$A_1 - T_1/CW$$

where:

$A_1$ is a value representative of vehicle acceleration at a first engine torque value ($T_1$), $T_1$ is a known first engine torque value, W is a value representation of gross vehicle weight, and C is a constant.

12. The method of claim 9 wherein said expected vehicle acceleration ($A_0$) is determined as a function of the expression $$A_1 - T_1/CW$$

where:

$A_1$ is a value representative of vehicle acceleration at a first engine torque value ($T_1$), $T_1$ is a known first engine torque value, W is a value representation of gross vehicle weight, and C is a constant.

13. The method of claim 12 wherein a value for the expression $C \cdot W$ is determined as a function of the expression $$(T_1 - T_2)/(A_1 - A_2)$$

where:

$A_2$ is a value representative of vehicle acceleration at a second engine torque value ($T_2$) and $T_2$ is a known second engine torque value where $T_2$ does not equal $T_1$.

14. A control method for controlling the at least partially automated implementation of automatically selected upshifts of a vehicular mechanical change gear transmission system comprising a controlled fuel throttle controlled engine (E), a multi-speed change gear mechanical transmission (10), having an input shaft (16) and an output shaft (90) adapted to drive vehicular drive wheels a master friction clutch (C) drivingly interposed between the engine and the transmission, a first sensor (98) for providing a first input signal indicative of transmission input shaft (16) rotational speed, a second sensor (100) for providing a second input signal indicative of vehicle speed, a third sensor (DL) for providing an input signal indicative of current engine torque, means for storing data indicative of expected deceleration rates of the transmission input shaft upon defueling of the engine with the master clutch engaged and the transmission shifted to neutral, a non-manually controllable transmission actuator (112, 70, 96) for controlling shifting of the transmission, said control method characterized by, upon selection of an upshift from a currently engaged gear ratio to a target gear ratio;

determining as a function of at least (i) curent engine torque (T) and (ii) current vehicle acceleration (A), an expected vehicle acceleration ($A_0$) under current vehicle operating conditions with the transmission shifted to neutral;

determining, as a function of at least (i) expected vehicle acceleration ($A_0$) under current vehicle operating conditions with the transmission shifted to neutral, (ii) the gear ratio of the selected target gear ratio and (iii) the expected deceleration rate of the transmission input shaft upon defueling of the engine with the master clutch engaged and the transmission shifted to neutral, feasibility or infeasibility of achieving substantially synchronous conditions for jaw clutch engagement of the target gear ratio if the selected upshift is initiated, and causing initiation of the selected upshift only upon a determination of feasibility of achieving said substantially synchronous conditions.

15. The method of claim 14 wherein said input signal indicative of vehicle speed is a signal indicative of output shaft (90) rotational speed.

16. The control method of claim 14 wherein said determining the expected vehicle acceleration under current vehicle operation conditions comprises:

causing a change in engine torque from a first torque value ($T_1$) to a second torque value ($T_2$) and determining the vehicle accelerations ($A_1$, $A_2$) at both said first and second engine torque values.

17. The method of claim 16 wherein said change in engine torque values is no greater than about ten percent (10%) of said first torque value and occurs for a period of time no greater than about one second.

18. The method of claim 14 wherein said expected vehicle acceleration ($A_0$) is determined as a function of the expression $$A_1 - T_1 CW$$

where:

$A_1$ is a value representative of vehicle acceleration at a first engine torque value ($T_1$), $T_1$ is a known first engine torque value, W is a value representation of gross vehicle weight, and C is a constant.

19. The method of claim 16 wherein said expected vehicle acceleration ($A_0$) is determined as a function of the expression $$A_1 - T_1/CW$$

where:

$A_1$ is a value representative of vehicle acceleration at a first engine torque value ($T_1$), $T_1$ is a known first engine torque value, W is a value representation of gross vehicle weight, and C is a constant.

20. The method of claim 19 wherein a value for the expression C·W is determined as a function of the expression $$(T_1 - T_2)/(A_1 - A_2)$$

where:

$A_2$ is a value representative of vehicle acceleration at a second engine torque value ($T_2$) and $T_2$ is a known second engine torque value where $T_2$ does not equal $T_1$.

* * * * *